United States Patent [19]

Patton

[11] Patent Number: 4,852,057

[45] Date of Patent: Jul. 25, 1989

[54] ALGEBRAIC EXPRESSION MANIPULATION METHOD AND IMPLEMENTATION FOR AN ELECTRONIC DATA PROCESSING APPARATUS

[75] Inventor: Charles M. Patton, Eugene, Oreg.

[73] Assignee: Hewlett-Packard Company, Palo Alto, Calif.

[21] Appl. No.: 923,921

[22] Filed: Oct. 27, 1986

[51] Int. Cl.[4] .............................................. G06F 7/38
[52] U.S. Cl. ............................................... 364/709.06
[58] Field of Search ................................ 364/709, 710

[56] References Cited

U.S. PATENT DOCUMENTS

| | | | |
|---|---|---|---|
| 3,518,629 | 6/1970 | Frankel | 364/709 |
| 3,839,630 | 10/1974 | Olander, Jr. et al. | 364/709 |
| 4,481,508 | 11/1984 | Kamei et al. | 364/709 |
| 4,698,784 | 10/1987 | Abell | 364/709 |

*Primary Examiner*—David H. Malzahn

*Attorney, Agent, or Firm*—Bloor Redding, Jr.

[57] ABSTRACT

An improved method and apparatus for performing operations on mathematical expressions in a data processing device, in which stored menus having labels of operations, performable on mathematical expressions, which are concordant with the syntax of individual expressions, are individually addressed by each expression developed in the data processing device. A selected label from a menu addressed by an expression is employed to perform an operation upon the expression. A change in form of an expression by a label of one menu, for example, selecting a subexpression of the expression, may address another menu. Where more than one menu exists for an expression a menu group is addressed by that expression and one menu of that group is displayed. The displayed menu and/or another menu or other menues from that group may be selected to provide labels for performing operations upon that expression.

10 Claims, 18 Drawing Sheets

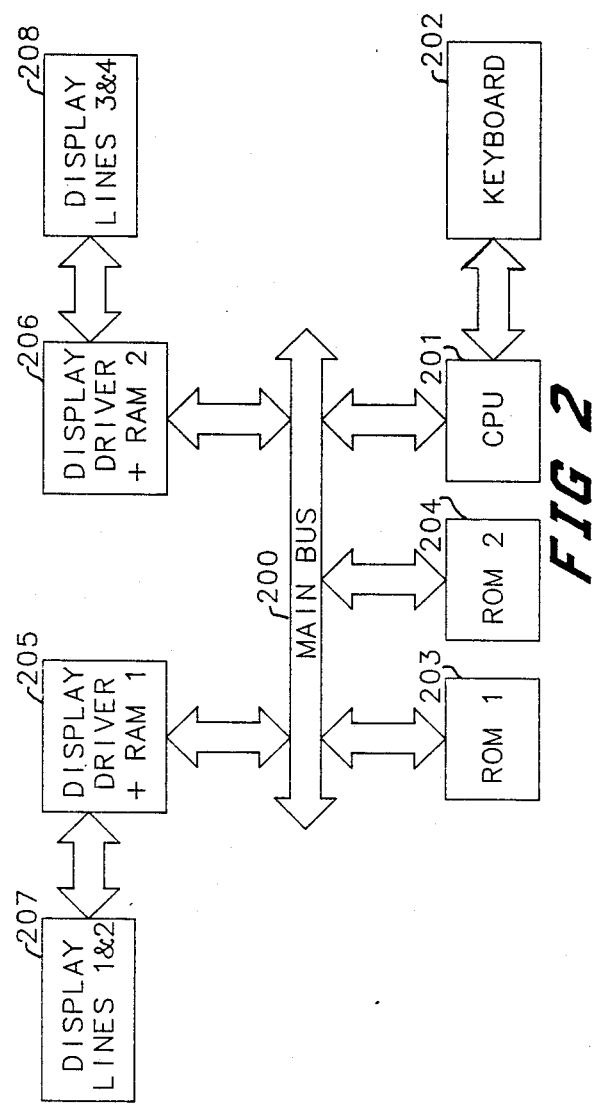

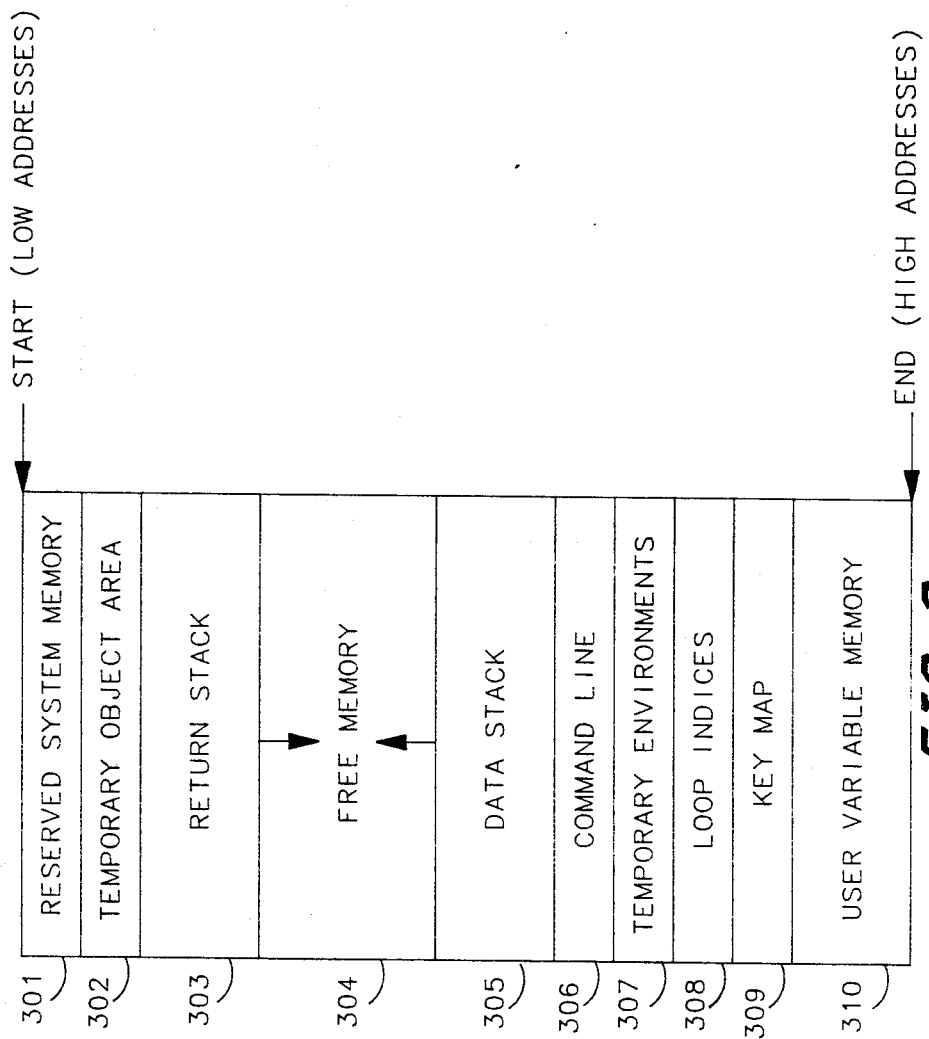

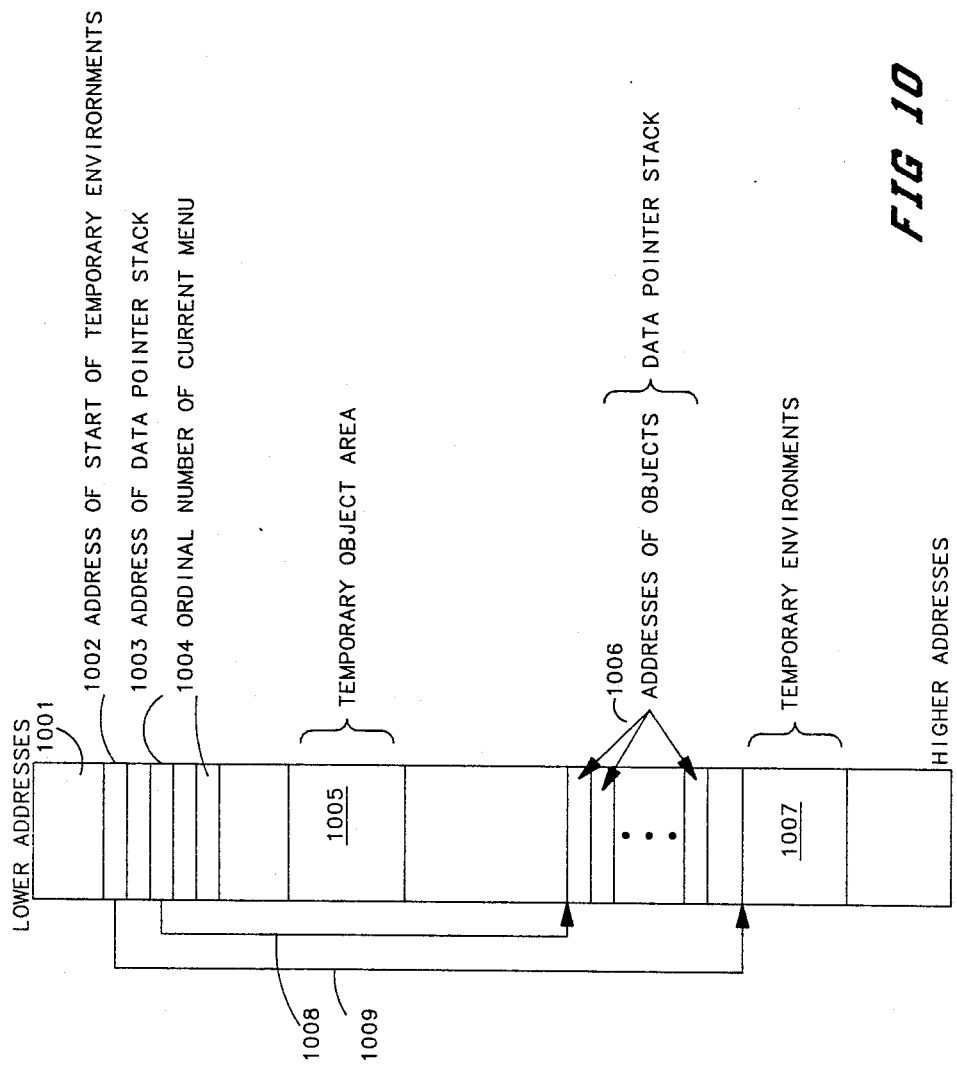

LOWER ADDRESSES

```
1101 ─┤ ADDRESS OF INTEGER 3 (IN ROM)
      │ REPRESENTING THE TOTAL NUMBER
      │ OF ELEMENTS IN THE EXPRESSION
1102 ─┤ ADDRESS OF THE ALGEBRAIC
      │ OPERATOR "LN"(IN ROM), BEING
      │ THE OUTERMOST OPERATOR IN THE
      │ EXPRESSION
1103 ─┤ ADDRESS OF THE ALGEBRAIC
      │ OPERATOR "+"(IN ROM)
1104 ─┤ ADDRESS OF FLOAT 2.3 (IN RAM)
      │ REPRESENTING THE LEFT HAND
      │ ARGUMENT OF "+"
1105 ─┤ ADDRESS OF FLOAT 1.0 (IN ROM)
      │ REPRESENTING THE RIGHT HAND
      │ ARGUMENT OF "+"

*
              *
              *

1106 ─┤ ADDRESS OF INTEGER 2 (IN ROM)
      │ REPRESENTING THE LOCATION OF
      │ THE OUTERMOST ELEMENT OF THE
      │ SELECTED SUBEXPRESSION
```

(DATA POINTER STACK / TEMPORARY ENVIRONMENT AREA)

HIGHER ADDRESS

STRUCTURE OF THE DATA POINTER STACK WHEN THE
EXPRESSION CORRESPONDS TO LN(1.0+2.3) AND THE
SELECTED SUBEXPRESSION IS 1.0+2.3.

FIG 11A

LOWER ADDRESSES

```
1101  ADDRESS OF INTEGER 3 (IN ROM)
      REPRESENTING THE TOTAL NUMBER
      OF ELEMENTS IN THE EXPRESSION
1102  ADDRESS OF THE ALGEBRAIC
      OPERATOR "LN"(IN ROM), BEING
      THE OUTERMOST OPERATOR IN THE
      EXPRESSION
1103  ADDRESS OF THE ALGEBRAIC
      OPERATOR "+"(IN ROM)
1104  ADDRESS OF FLOAT 1.0 (IN ROM)
      REPRESENTING THE LEFT HAND
      ARGUMENT OF "+"
1105  ADDRESS OF FLOAT 2.3 (IN RAM)
      REPRESENTING THE RIGHT HAND
      ARGUMENT OF "+"

*
              *
              *

1106  ADDRESS OF INTEGER 2 (IN ROM)
      REPRESENTING THE LOCATION OF
      THE OUTERMOST ELEMENT OF THE
      SELECTED SUBEXPRESSION
```

DATA POINTER STACK

TEMPORARY ENVIRONMENT AREA

HIGHER ADDRESS

SAME AS FIG 11A SHOWING THE RESULT OF THE
OPERATION COMMUTE ON THE INDICATED SUBEXPRESSION.

FIG 11B

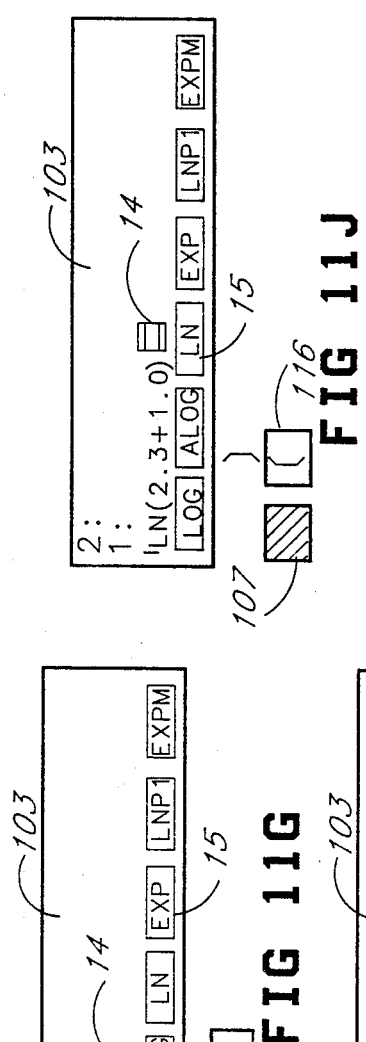
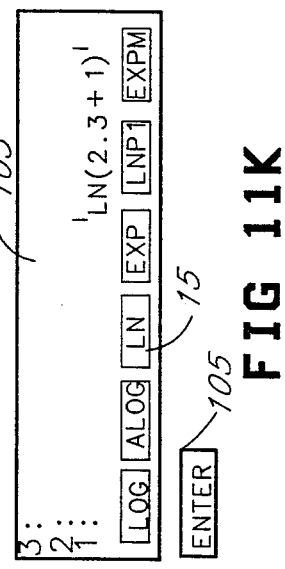
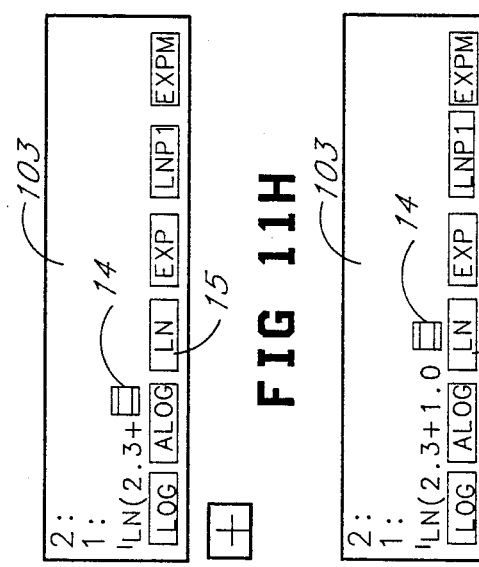

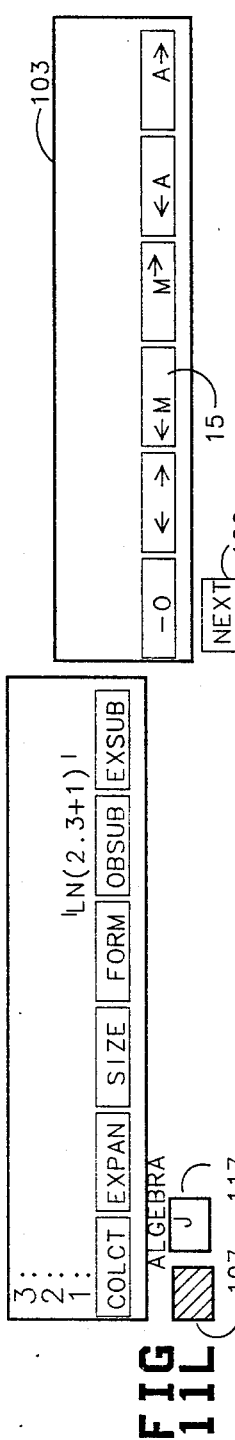
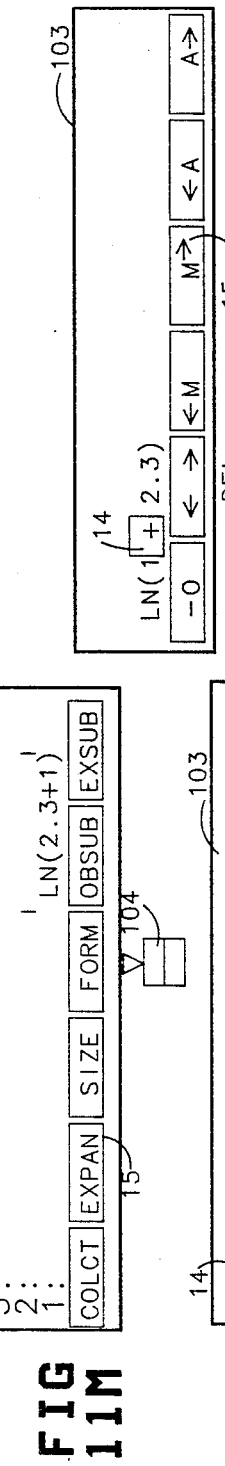
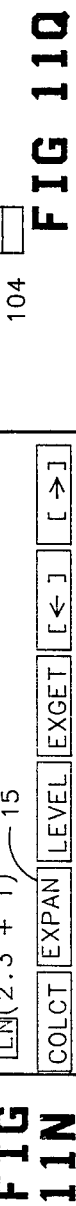
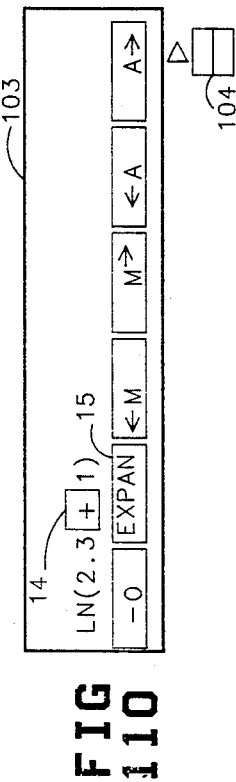

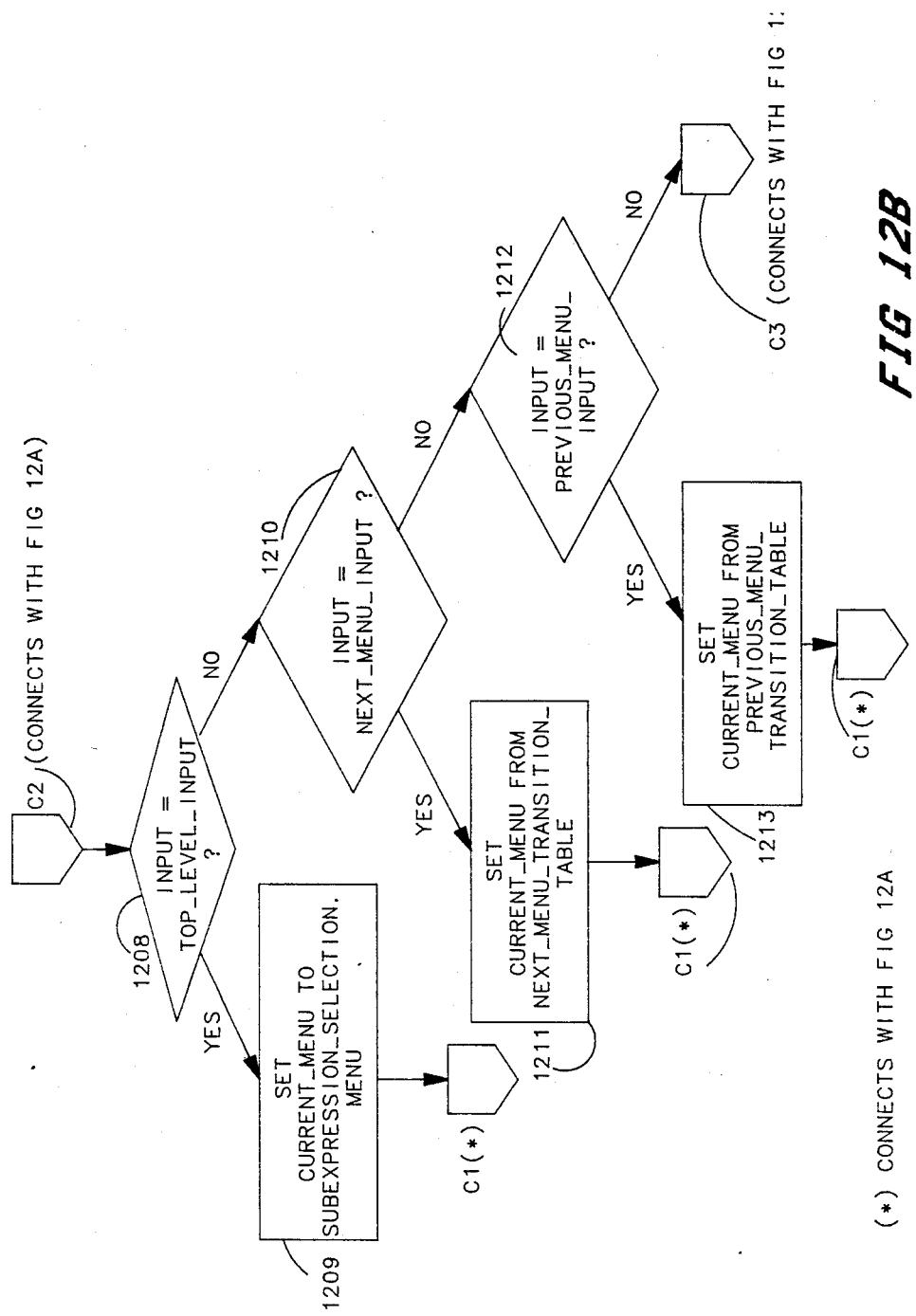

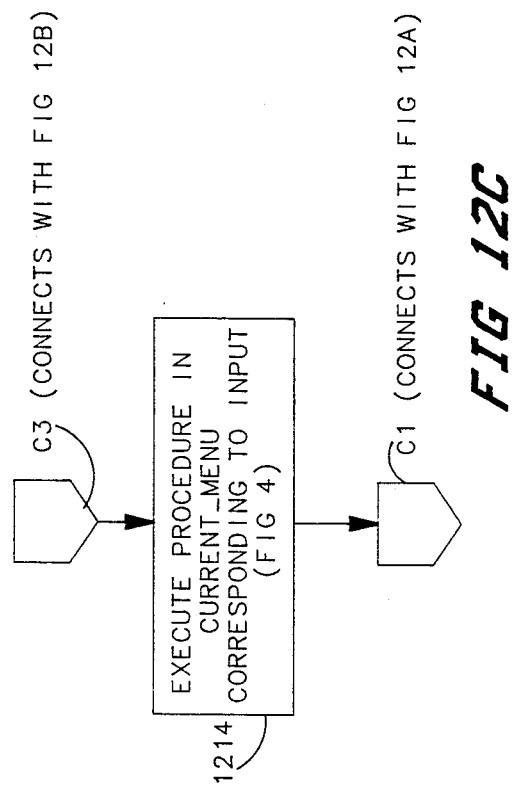

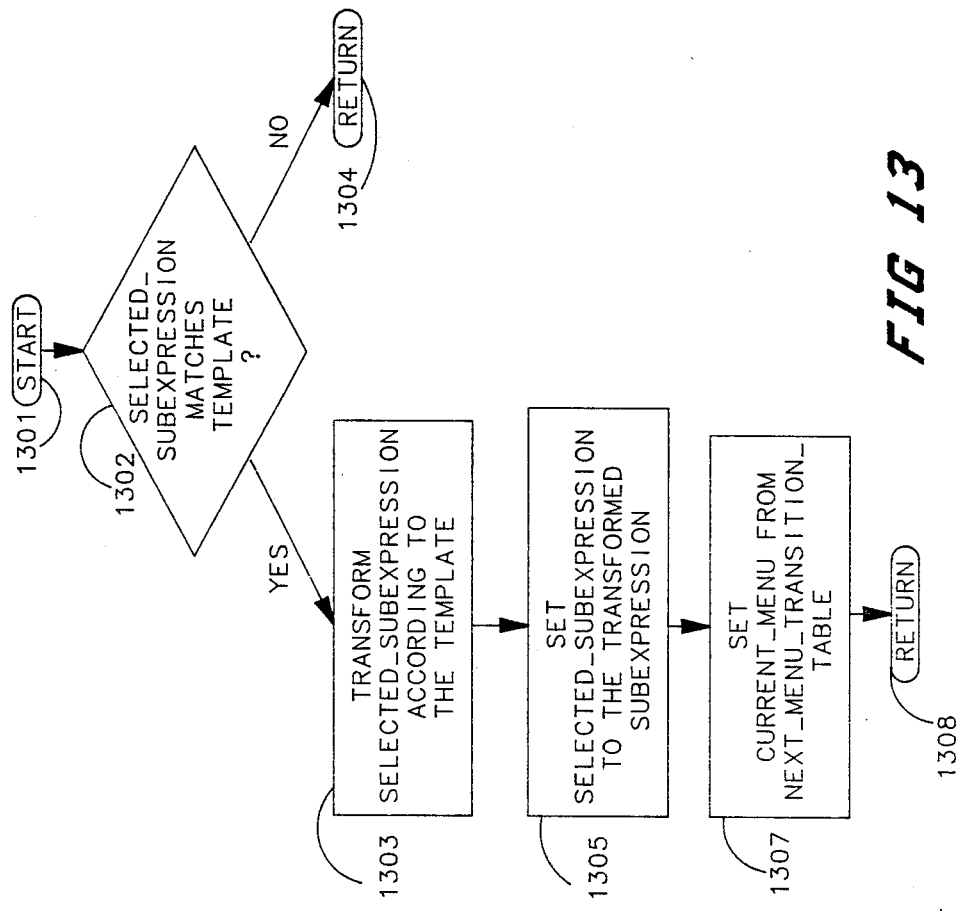

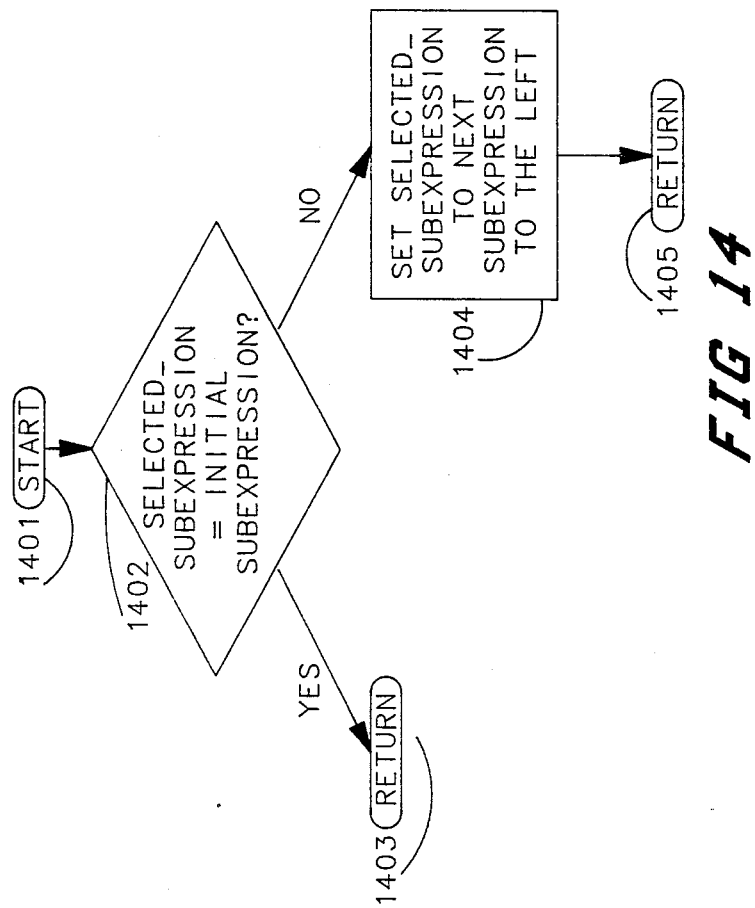

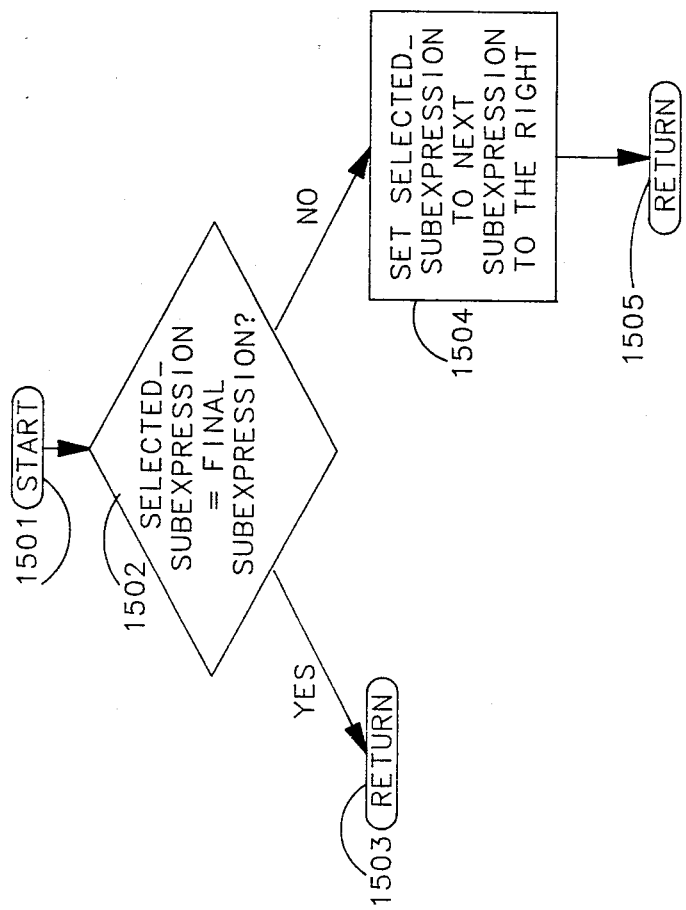

ALGEBRAIC EXPRESSION MANIPULATION METHOD AND IMPLEMENTATION FOR AN ELECTRONIC DATA PROCESSING APPARATUS

TECHNICAL FIELD

This invention relates generally to electronic data processors and scientific calculators and more particularly to methods and apparatuses in such processors and calculators for providing improved algebraic expression manipulation capabilities.

BACKGROUND ART

Scientific calculators are typically hand held or desktop devices which include a manually actuable keyboard for receiving input data and operational commands from the operator and a visual display for communicating results to the operator. A more recent development is the provision of an alphanumeric display which allows for the entry, display, and editing of data structures which are more complicated than simple numbers. In particular, it allows for entry, display, and editing of equations and algebraic expressions.

The increasing complexity of these scientific calculators together with the trend toward providing more diverse data structures has provided impetus for automating the editing process for these data structures. Previous calculators have employed so called character editors for editing equations and algebraic expressions, wherein the operator may delete, insert, or overwrite individual characters or groups of characters in the displayed form of the equation or expression.

While character editors are useful and important for the correction of operator inputting errors, they are highly deficient for the purpose of rearranging a formally correct expression which appears in an inappropriate form. As an example, consider the expressions:

(alog(2N)+1)−alog(2N) and (alog(2N)−alog(2N))+1 where alog is the common antilogarithm function, and N is the number of significant digits carried by the calculator. While these expressions are formally equivalent, they will yield different results when evaluated on the calculator, and only the second form will yield the correct result. A primary deficiency of a character editor, then, is that it will not allow the operator to transform the first expression into the second expression without considerable effort and the possibility of introducing errors into the expression.

A second deficiency of character editors for this kind of editing is the lack of guidance for the operator in the processes of transforming an expression into a formally equivalent one.

DISCLOSURE OF THE INVENTION

The present invention provides an improved algebraic expression manipulation capability together with an improved operating sequence to enhance operator/machine interface when editing entered or calculated algebraic expressions. It provides visual feedback which indicates to the operator which mathematically correct algebraic manipulations are concordant with the currently selected subexpression of the expression being edited. It provides the capability to select and to carry out an algebraic manipulation in a manner which precludes the possibility of operator error.

This invention may be practiced in several ways. One manner of practicing the present invention provides an operating sequence whereby any subexpression may be selected and the subexpression so selected is indicated by an alteration of the displayed form of that subexpression.

A second manner of practicing the present invention provides an operating sequence whereby menu labels containing indicators of the algebraic manipulations concordant with the currently selected subexpression of the expression being edited can be displayed.

A third manner of practicing the present invention provides an operating sequence whereby an algebraic manipulation can be selected in response to the displayed menu label containing indicators of the algebraic manipulations concordant with the currently selected subexpressions of the expression being edited, and the selected manipulation will be carried out in a manner which precludes the possibility of operator error, and the result of the manipulation is displayed and is available for further editing.

BRIEF DESCRIPTION OF DRAWINGS

FIG. 2 illustrates the internal chip-level architecture of the calculator of FIG. 1, which inheres presently implemented best mode of practicing the invention.

FIG. 3 is a map illustrating the utilization of the random access memories of FIG. 2.

FIG. 10 illustrates the essential structural aspects of the random access memories of FIG. 2, including a data pointer stack.

FIGS. 12A, 12B and 12C together illustrate a flow chart of the operations involved in the automated and error free editing of algebraic expressions in the improved calculator.

FIG. 13 is a flow chart illustrating the data processing commands of menu items which execute the transformations of subexpressions.

FIG. 14 is a flow chart which illustrates the operation of a menu item called Cursor Left in a subexpression-selection menu described herein.

FIG. 15 is a flow chart which illustrates the operation of a menu item called Cursor Right in a subexpression selection menu described herein.

BEST MODES FOR CARRYING OUT THE INVENTION

Figure 1:
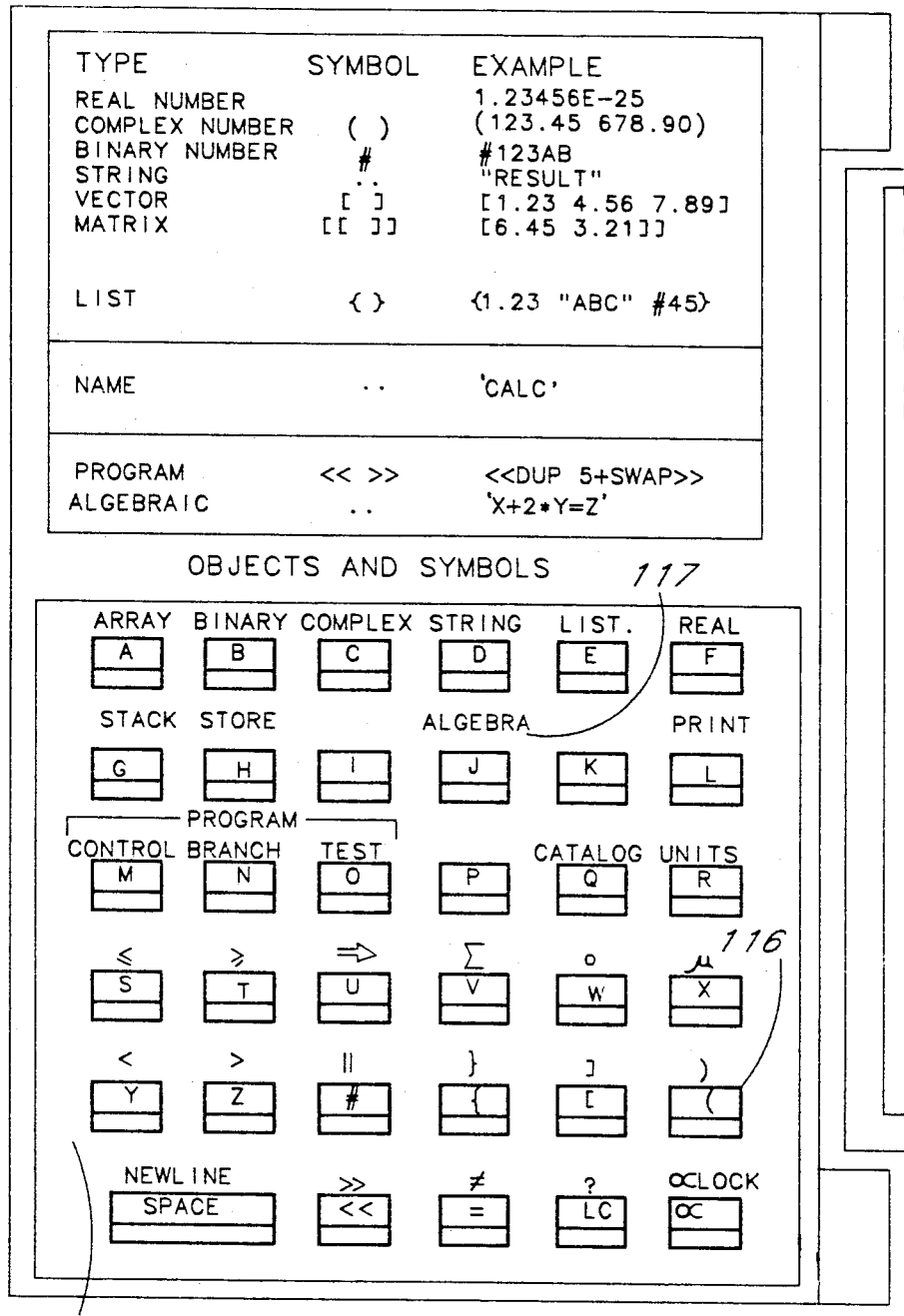
FIG. 1 illustrates a calculator, having two keyboards and a display, which represents a presently preferred embodiment of this invention.
Figure 1A:
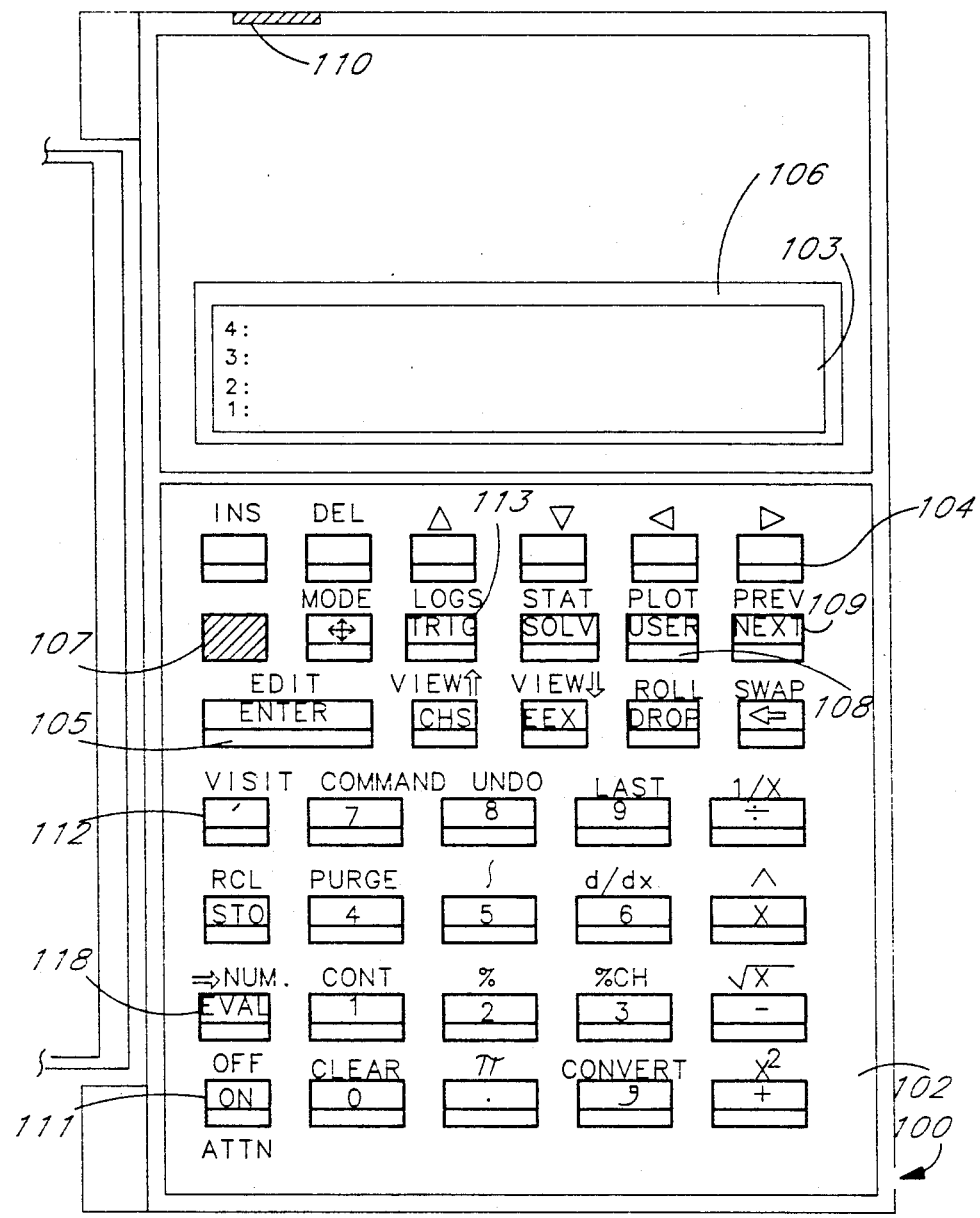

In FIGS. 1 and 1A, a calculating device 100 is shown having a first section 101 and a second section 102. First section 101 includes a plurality of keys, which include keys for entering alphanumeric symbols.

Second section 102 includes a display 103. In the preferred embodiment, display 103 is a liquid crystal, dot array display which displays four lines of twenty-three characters each. Display 103 also includes a line 106 of annunciators, which are used to indicate various calculator modes of operation.

Second section 102 also includes a plurality of keys, including number keys and function keys as labeled. An ENTER key 105 is used to terminate alphanumeric character entry and to begin processing of the entry. During the operation of the present invention pressing this key signals a request to return to the subexpression-selection menu (FIG. 12B). A shift key 107 acts to cause the next key pressed to execute its alternate definition, as labeled above that key.

Second section 102 also includes a row of six multi-function keys 104, which may have associated with them a function or the value of a variable. The current definition of a multi-function key is indicated by a menu label displayed directly above the key, in the bottom-most character row of the display 103.

First and second section 101 and 102 contain various keys that assign groups (menus) of associated calculator functions, in subgroups of 6 to the multi-function keys 104. Included is a USER menu key 108, that assigns user variables automatically to the multi-function keys 104. A NEXT key 109 causes the multi-function key assignments to advance to the next group of six functions in the current menu. During the operation of the present invention, pressing this key signals a request to advance the menu to the next menu appropriate to the selected subexpression of the edited expression. The shifted function of this key 109 reactivates the previous six functions. During the operation of the present invention, pressing the shift key followed by the key 109 signals a request to change the menu to the previous menu appropriate to the selected subexpression of the edited expression. As each menu is selected the menu label therefore is displayed.

Second section 102 also contains an infrared light-emitting diode 110, which is used for transmitting data to a corresponding receiver, typically a printing device.

The ON key 111 is a special interrupt key that allows the user to turn the calculator on or off, and to interrupt normal calculator operation when the calculator is on. During the operation of the present invention, pressing this key signals a request to exit from the editing session.

FIG. 2 shows the internal chip-level architecture of calculating device 100. A central processing unit (CPU) 201, two read-only memories (ROM) 203 and 204, and two combination display driver and random-access memories 205 and 206, are shown coupled to a main bus 200. Each display driver controls half, 207 and 208, respectively, of the liquid crystal display 103. A keyboard 202 is shown coupled to the central processing unit 201. Keyboard 202 may include two sections of keys 101 and 102, FIG. 1, but may also represent alternate forms of entry of data such as a touch-sensitive screen.

FIG. 3 is a map of the utilization of the random access memories 205 and 206 by the operating system contained in the read only memories 203 and 204 to support the use interface of this invention. The fundamentals of this operating system are described in patent application Ser. No. 868,978, filed: May 30, 1986, for a Data Processing System and Method for the Direct and Indirect Execution of Uniformly Structured Object Types, and assigned to the assignee of this invention.

In the referenced system, uniformly structured objects are indifferently mixed in object memory with object pointers. The objects address prologues of object execution sequences in memory. The object pointers address other objects. The objects are properly evaluated whether directly or indirectly addressed. A pointer selectively points to or addresses objects or object pointers.

When an object is directly addressed by the pointer, the addressee of the object's addressee in memory is addressed which initiates the object execution sequence.

When an object is indirectly addressed, the pointer addresses an object pointer. The object pointer addresses an object. The object's addressee in memory is addressed which initiates the object execution process.

More particularly, the object execution process employed in this invention, provides for correct and automatic evaluation of both objects and object pointers which are indifferently included in the execution sequence. The objects are provided with a uniform structure so that all objects can be indifferently executed, either directly or indirectly. Objects of different types are still uniformly structured. Each comprises at least a prologue address and a body. These two parts are contiguous in memory. The prologue address addresses a prologue in memory which describes execution of the object. The body is data. An object is pointed to, or addressed, if its prologue address part is pointed to or addressed.

The object may be a single object or a composite object. If its body is a sequence of objects and/or object pointers it is a composite object.

In the direct execution of an object, a pointer, called an interpreter pointer, points to the prologue address of an object. This prologue address addresses a prologue of object execution in memory which directly identifies an object to execute. In indirect execution of an object, the interpreter pointer points to an object pointer which in turn points to or addresses the prologue address of an object which is the object to execute. Since the object pointer does not address a prologue in memory, there is no direct identification of an object to execute. The prologue address addresses a prologue of object execution in memory.

Thus in providing uniformity of structure among the objects, in which each comprises a prologue address and a body, in the provision of prologues of object execution in memory and in the use of object pointers and interpreter pointers in which interpreter pointers and object pointers may selectively identify objects by pointing to their prologue address parts and, additionally, in which an interpreter pointer may point to an object pointer, a simple technique is provided, permitting intermixing of objects and object pointers for direct or indirect object execution with a minimum of processing steps. This reduces programming and conserves memory which significantly reduces processing overhead.

Calculator operation centers around evaluation of objects on the display stack. An object can be data, a name or a procedure. To evaluate an object means to perform the action associated with that object. Data objects do nothing special (they are first data), name objects refer to other objects, and procedure objects process the objects and the commands in their definitions.

The term object, as used here and in the referenced patent application represents any of the multiplicity of data types supported by the operating system, including mathematical data and expressions, programs, etc. Objects may exist in the read only memories 203 and 204, the temporary object area 302, or the user variable area 310.

A reserve system memory area 301 contains memory addresses that identify the remaining memory regions 302–310, plus other permanently allocated system data.

A temporary object memory area 302 contains nameless objects, created during calculator use.

A return stack memory area 303 is a last in first out stack of addresses that constitute pointers to object sequences representing pending calculator operations. This stack grows towards the end (higher addresses) of memory.

A free memory 304 is the region of memory currently unused.

A data pointer stack memory 305 is a last in first out stack of addresses that constitute pointers to objects. The user interface of the present invention displays a human-readable form of the objects pointed to by the stack pointers, rather than the pointers themselves. The data pointer stack 305 grows into free memory towards the start (lower addresses) of memory.

A command line memory area 306 is a dynamically allocated memory used to accumulate user-entered commands and data in the form of text characters.

A temporary environment memory area 307 is a dynamically allocated linked-list of objects used primarily for storage of intermediate results and parameter passage.

A loop indices memory area 308 is used to save start and stop indices for looping program constructs.

A key map memory area 309 defines the current functions associated with each keyboard key.

A user variable memory area 310 contains named objects (variables) created explicitly by the user.

Figure 4:
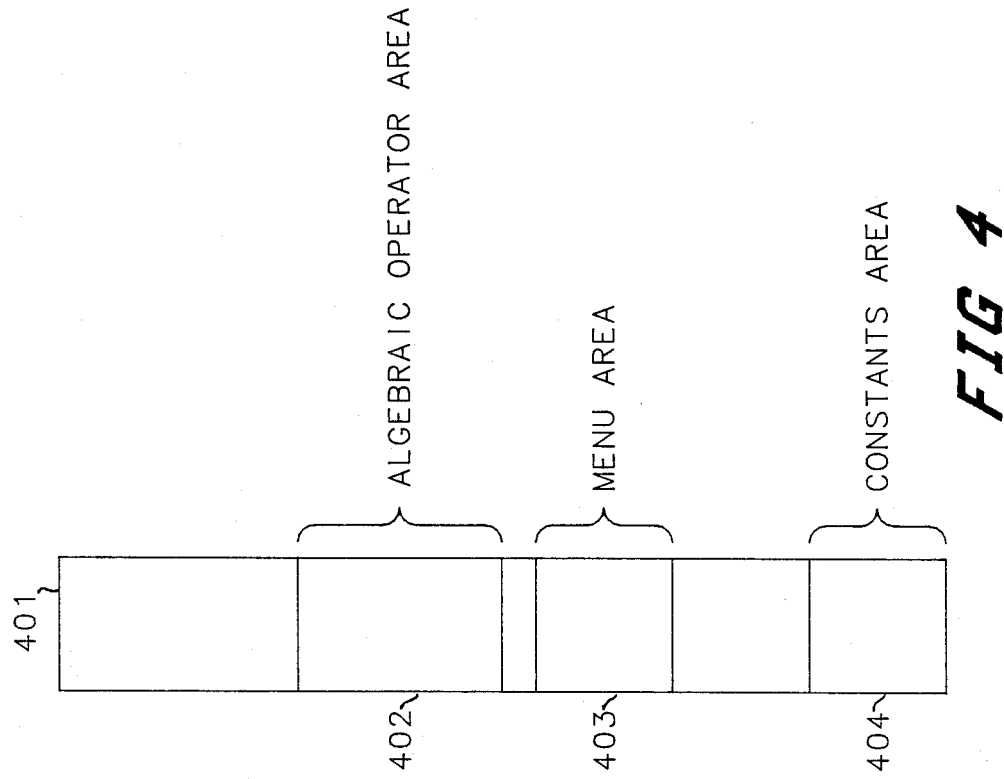
FIG. 4 illustrates the essential structural aspects of the read only memories of FIG. 2.

FIG. 4 illustrates the relevant structure of the read only memories 203 and 204 in accordance with the preferred embodiment of the present invention. In particular it illustrates the presence of an algebraic operator memory area (402) in which the memory structures corresponding to algebraic operators in the system are stored, a menu area (403) in which the memory structures representing displayed menus are stored, and a constants area (404) in which memory structures corresponding to commonly occurring data constants are stored.

Figure 5:
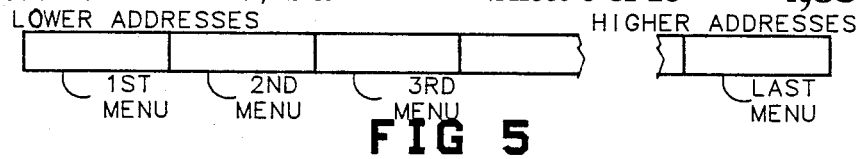
FIG. 5 illustrates the structure of the menu area of the read only memories of FIG. 2.

FIG. 5 illustrates the structure of the menu area of the read only memories 203 and 204 in accordance with the preferred embodiment of the present invention. In particular, the menu area comprises a contiguous sequence of menu data structures, beginning at a fixed known address. Additional information on the structures of menu data structures is illustrated in FIGS. 6, 7, and 8.

Figure 6:
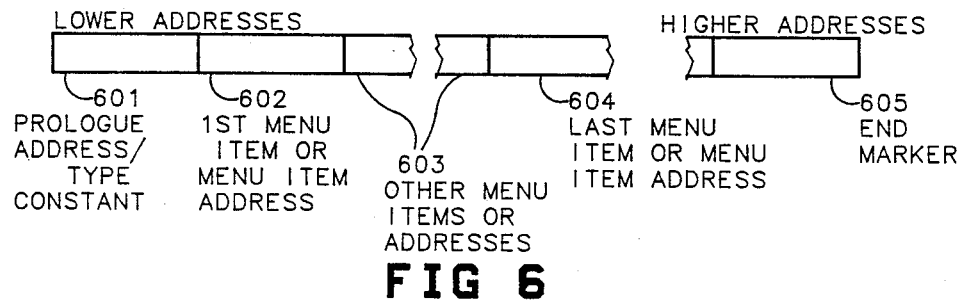
FIG. 6 illustrates the structure of a menu in a menu area of memory in particular reference to menu items.

FIG. 6 illustrates the memory structure corresponding to a menu in accordance with the current invention. In particular, a menu begins with a prologue address/type constant (601) which serves the dual purpose of providing the address of executable code which initiates the execution of the menu structure and also serves to define the type of the data structure it heads. Following the prologue address/type constant is the first menu item or the address of the first menu item (602), other menu items or addresses of menu items (603), and the last menu item or address of a menu item (604). Following the last menu item is an end marker (605) which is paired with the prologue address/type constant and which delimits the end of the menu.

Figure 7:
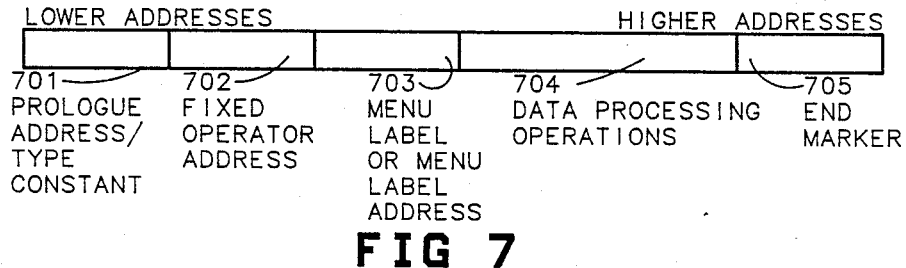
FIG. 7 illustrates the memory structure of a menu item which includes a menu indicator.

FIG. 7 illustrates the structure of a menu item in accordance with the preferred embodiment of the present invention. In particular, a menu item begins with a prologue address/type constant (701) which serves the dual purpose of providing the address of executable code which initiates the execution of the menu item and also serves to define the type of the data structure it heads. Following the prologue address/type constant is a fixed operator address (702) which operator shields the menu label or menu label address (703) from execution during the execution of the body of the menu item. The menu label which is displayed to the user comprises the indicators of the character data to indicate which menu options are currently active and available for execution. Following the menu label or menu label address is a sequence of data processing commands (704) which serve to define the operation of this menu item. Following the last data processing command is an end marker (705) which is paired with the prologue address/type constant and which delimits the end of the menu item.

Figure 8:
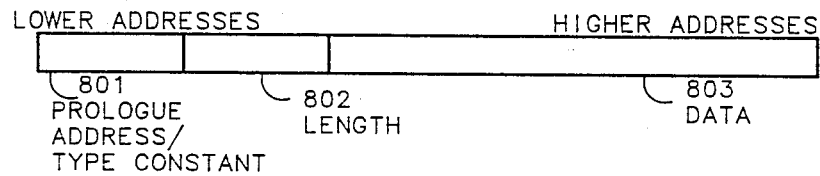
FIG. 8 illustrates the memory structure of a menu indicator.

FIG. 8 illustrates the memory structure of a menu label in accordance with the preferred embodiment of the present invention. In particular a menu label begins with a prologue address/type constant (801) which serves the dual purpose of providing the address of executable code which initiates the execution of the menu label structure and also serves to define the type of the data structure it heads. Following the prologue address/type constant is a length indicator (802) which serves to determine the length of the menu label structure, and following this is the character data (803) which serves to define the characters to be displayed to the user when a menu item in which this menu label is referenced is active and available for execution.

Figure 9:
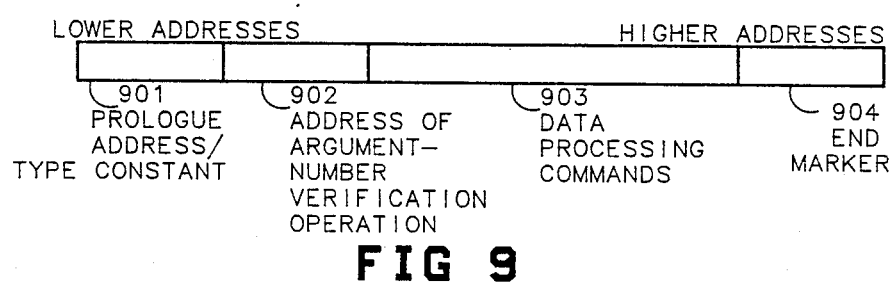
FIG. 9 illustrates the memory structure corresponding to an algebraic type of operator, as employed in this invention.

FIG. 9 illustrates the memory structure corresponding to an algebraic operator in accordance with the preferred embodiment of the present invention. In particular, an algebraic operator begins with a prologue address/type constant (901) which serves the dual purpose of providing the address of executable code which initiates the execution of the algebraic operation and also serves to define the type of the data structure it heads. Following the prologue address/type constant is the address (902) of one of a fixed number of operations which verify and serves to define the number of arguments this operator uses. Following this address is a sequence (903) of data processing commands which are specific to the algebraic operator and serve to define its operation. Finally, there is an end marker (904) which is paired with the prologue address/type constant and which delimits the end of the algebraic operator.

FIG. 10 illustrates the relevant structure of either of the random access memories 205 and 206 in accordance with the preferred embodiment of the present invention. In particular, there is at a fixed location (1002) the current address of the start of the temporary environment area (1007) (as illustrated by the arrow (1009)) wherein addresses of temporarily needed data objects may be stored. At a second fixed location is the address (1003) of the data pointer stack (1006) (as illustrated by arrow (1008)) comprising an implicitly linked list of addresses of objects which are the implicit argument for data processing operations. At a third fixed location (1004) is contained the representation of the ordinal number of the menu within the menu area defined to be the current menu. The temporary object area (1005) contains objects created by data processing operations and may be referenced by addresses on the data pointer stack or within the temporary environment area.

FIGS. 11A and 11B illustrate examples of the state of the data pointer stack during the operation of the preferred embodiment of the present invention. In these examples, the user is editing the expression:

LN(2.3+1.0)

where LN represents the (natural log) base-e logarithm function.

The expression LN (2.3+1.0) is defined as an algebraic object, as is the subexpression (2.3+1.0). An algebraic object is a procedure that is entered and displayed in mathematical form. It can contain numbers, variable names, functions, and operators, defined as follows:

Number: A real number or complex number.

variable name: Any name, whether or not there is currently a variable associated with the name. When such a name is evaluated, it returns itself.

Function: A command that is allowed in an algebraic procedure. Functions must return exactly one result. If one or more of a function's arguments are algebraic objects, the result is algebraic. Most functions appear as a function name followed by one or more arguments contained within parentheses; for example, LN(X).

Operator: A function that generally doesn't require parentheses around its arguments. These include prefix operators whose names appear before their arguments, for example, unitary negation and infix operators whose names appear between their two arguments, for example, +.

Procedure: A procedure obeys algebraic syntax if, when evaluated, it takes no arguments from the stack and returns exactly one argument to the stack, and if it can be subdivided completely into a hierarchy of subexpressions. A subexpression can be a number, a name, or a function and its arguments. By hierarchy, it is meant that each subexpression can itself be an argument of a function. For example, consider the expression:

LN(2.3+1.0)

The expression contains two numbers, (2.3 and 1.0) each of which can be considered as a simple subexpression. The expression also contains two functions, +, and LN, each of which defines a subexpression along with its arguments. The arguments of + are 2.3 and 1.0; 2.3+1.0 is the argument of LN. The hierarchy becomes more obvious if the expression with its operators is rewritten as ordinary functions (Polish notation).

LN(+(2.3,1.0))

An object or subexpression within an expression is characterized by its position and level.

The position of an object is determined by counting from left to right in the expression. For example, the expression LN(2.3+1.0), LN has position 1, and + has position 2.

The position of a subexpression is the position of the object that defines the subexpression. In the same example, LN(2.3+1.0) has position 1, since it is defined by LN in position 1.

The level of an object within an algebraic expression is the number of pairs of parentheses surrounding the object when the expression is written in purely functional form, for example, in the expression LN(2.3+1.0), LN has level 0, + has level 1 and 2.3 and 1.0 have level 2. Every algebraic expression has exactly one level 0 object.

If the above expression is rewritten again, by removing the parentheses, and placing the functions after their arguments, the reverse polish notation form of the expression is obtained:

2.3,1.0+LN

This defines a program that has algebraic syntax, and is effectively equivalent to the corresponding algebraic object.

In the expression LN(2.3+1.0), the subexpression 2.3+1.0 has been selected for further editing. The operational commands to enter the expression and to request the menu of manipulation operations concordant with the form of the selected subexpression are assume to have been performed. These are described at a later point. Illustrated in FIG. 11A is the state of the data pointer stack under these conditions, wherein the top of the data pointer stack (1101) contains the address of the representation of the integer 4 which representation resides in the constants area of the read only memory 203 and 204. This first element on the data pointer stack represents the total number of elements, LN, 2.3, +, 1.0, of the expression being edited. Next in the stack is the address (1102) of the outermost operator, LN, of the expression, in this case the operator corresponds to the natural logarithm. It occupies the first address position of an operator in the data pointer stack in the random access memory, defined as integer 1. Beyond this is the address (1103) of the next-outermost operator, +, of the expression, in this case the operator is addition. It occupies the second address position of an operator in the data pointer stack in the random access memory, defined as integer 2. Note that the number of arguments for each operator can be computed from the address of the operator using the previously illustrated structure of algebraic operators. The arguments in this case are 2.3 and 1.0. Following the address of the addition operator are the arguments for the addition operator. In this case the left hand argument is represented by the address (1104) of the representation of the number 2.3, which, since it is not an especially common number, has been created in the temporary object area of a random access memory. The right hand argument of addition is represented by the address (1105) of the representation of the number 1.0, which, since it is a commonly used number, resides in the constants area of a read only memory.

In this situation, the temporary environment area contains, at a computable location, the address of the representation of the integer 2, which integer signifies the location within the data pointer stack of the address of a second operation which is the address of the outermost operator (+) of the selected subexpression (2.3+1.0), which then signifies the selected subexpression. In this case, the integer is 2 signifying the second operation address within the expression, that is, the address of the second operator, the addition operator (+).

FIG. 11B illustrates the state of the data pointer stack following the user-selected operation of the commute operator, which in this case interchanged the two arguments, 2.3 and 1.0, of the addition operator with the result that the new left hand argument of the addition operator is represented by the address (1104) of the representation of the number 1.0, and the new right hand argument of the addition operator is represented by the address (1105) of the representation of the number 2.3. The resulting edited selected subexpression is thus 1.0+2.3 and the resulting edited expression is LN(1.0+2.3).

Figure 11C:
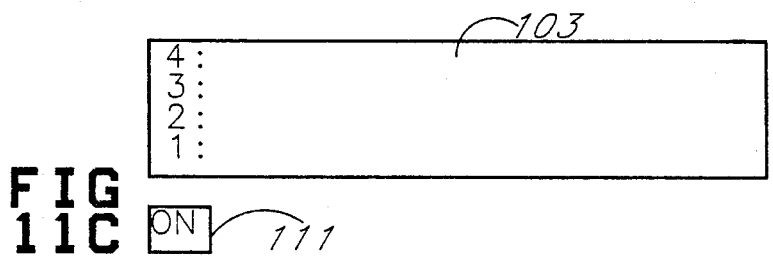
FIGS. 11C through 11Q illustrate the display seen by the user in the step by step entering and editing operation of the indicated expression.

The specific steps for entering and editing the expression LN(2.3+1.0) in the calculator are described below, in reference to FIGS. 11C through 11Q.

1. Press [ON] key 111. The display is as seen in FIG. 11C. The four lines of the display are numbered on the left of the screen in descending order from top to bottom. This is an immediate entry mode.

Figure 11D:
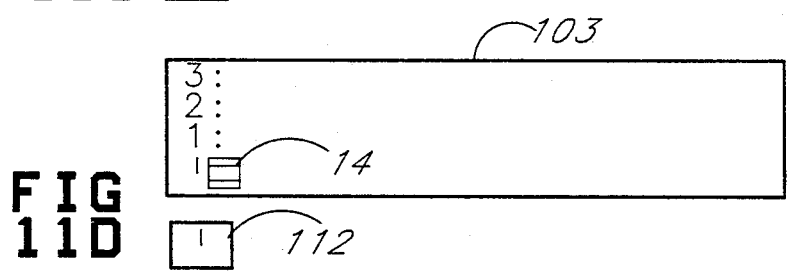
FIGS. 11A and 11B illustrate examples of the state of the data pointer stacks during a specific editing operation of the expression LN (2.3+1.0), employing reverse polish notation.

2. Press ['] key 112. The display is as seen in FIG. 11D. In the immediate entry mode, this initiates or activates the algebraic entry mode. The algebraic cursor 14 is in the lower left corner (line 1) of the display screen. In this mode, pressing a command key executes the command. Pressing a function key adds the function name to the command line. If the function takes its arguments in parentheses, such as LN(2.3+1.0), the opening parentheses is also added.

Figure 11E:
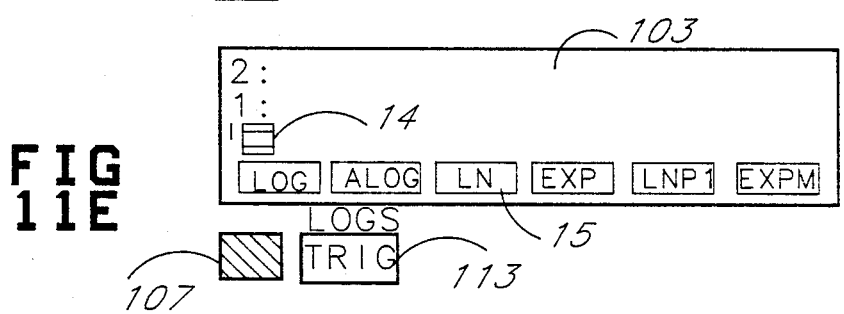

3. Press the shift key 107 and the shifted LOGS key 113. The display is as seen in FIG. 11E. The individual menu labels 15 are displayed in line 1. The algebraic cursor 14 is lifted to line 2 and numbered lines 1 to 4 are shifted up, leaving numbered lines 1 and 2 visible.

Figure 11F:
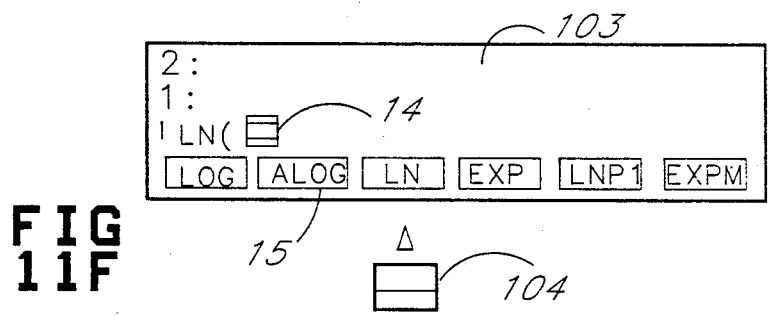

4. Press LN. This is that menu key 104 immediately below label LN in the menu display. The display is as indicated in FIG. 11F. The function LN with a bracket on its right is added in line 2 and the algebraic cursor 14 is shifted to the right.

5. The expression 2.3+1.0 is now added by actuating the correspondingly marked keys in sequence. The displays corresponding to these steps appear in FIGS. 11G, H and I. The menu labels remain unchanged.

6. Next press the shift key 107 and the shifted key 116. This adds the bracket, FIG. 11J, to the end of the expression, which completes the quantity (2.3+1.0).

7. The ENTER key 105 is now actuated. This shifts the expression to the right side of the display, as seen in FIG. 11K, and enters the expression at the bottom of the display stack. The cursor 14 disappears.

8. The shifted ALGEBRA key 117 is next actuated. This involves first actuating the shift key 107 and then actuating the shifted ALGEBRA key 117. This brings the algebraic operations to the menu allowing the editing operation of the expression to be edited to be selected. The menu labels of the selected menu are displayed. The menu label changes as seen in FIG. 11L.

9. In FIG. 11M, the display is shown prior to the time the multifunction key 104 is actuated. The operation selected for execution is FORM.

10. FIG. 11N shows the display after execution of the operation FORM. The complete expression LN(2.3+1.0) is displayed at the left of the screen with a new cursor 14 positioned over LN. This is the algebraic editor cursor (FORM cursor). The menu changes again, FIG. 11N, to one having 4 menu labels permitting manipulation of the cursor to a selected operator, in this case +, FIG 11D.

FORM is an interactive expression editor which enables the rearrangement of an algebraic expression or equation according to standard rules of mathematics. All of FORM's mathematical operations are identities; that is, the result expression will have the same value as the original argument expression, even though the two may have different forms. For example, with FORM it is possible to rearrange 'A+B' to 'B+A', which changes the form but not the value of the expression.

When FORM is executed, FIG. 11N, the normal stack display is replaced by a special display of the algebraic object, along with a menu of FORM operations displayed in the labels in line one at the bottom of the display. The special display initially starts in line two of the display, and wraps into line three if the object is too long to display in a single line. If the object requires more than two display lines, it is necessary to move the FORM cursor through the object to view the remainder.

To exit FORM and continue with other calculator operations, the ON key is pressed.

The FORM cursor highlights an individual object in the expression display. The highlighted object appears as a white character against a black background. The cursor identifies both the selected object, which is highlighted, and the selected subexpression, which is the subexpression consisting of the selected object and its arguments, if any.

The cursor can be moved to the left or right in the expression by pressing keys in the menu beneath the arrows ← or →; when the cursor moves, it moves directly from object to object, skipping any intervening parentheses. The cursor is always in line two of the display counting from the bottom. The menu is in the bottom line of the display. If an attempt is made to move the cursor past the right end of line two, the expression scrolls up one line in the display, and the cursor moves back to the left end of line two. Similarly, if an attempt is made to move the cursor past the left end of line two, the expression scrolls down one line, and the cursor moves to the right end of line two.

The expression display differs from the normal stack algebraic object display by inserting additional parentheses as necessary in order to make all operator precedence explicit. This feature helps to identify the selected subexpression associated with the selected object as shown by the cursor. This is important, since all FORM menu operations operate on the selected subexpression.

While FORM is active, a special set of operations is available as menu keys. The initial menu (subexpression selected menu), FIG. 11M, contains six operations common to all subexpressions. Additional menus of operations are available via the NEXT and PREV key, 109; the contents of the additional menus vary according to the selected subexpression. Only those operations that apply to the selected subexpression are shown.

The first six menu keys can be reactivated at any time by pressing ENTER.

11. The menu key 104 beneath the arrow pointed to the right is now actuated twice. This steps the algebraic cursor 14 from LN to 2.3 to +. This final position is displayed in FIG. 11D.

12. Key 109 marked NEXT, as seen in FIG. 11P, is actuated to bring up a menu having a menu label permitting switching the numbers 2.3 and 1. Each actuation of the NEXT key 109 displays a different set of menu labels from different menus in a menu group until all have been displayed, at which time the menu display recycles. The menus in the group include only those concordant with mathematical operations which are permissible on the expression. The user selects the appropriate menu for the desired manipulation of the expression. The one displayed contains an indicator comprising oppositely pointed arrows in the second menu label position from the left.

13. As seen in FIG. 11Q, actuation of the menu key 104, directly beneath the double ended arrow menu label, switches or interchange the positions of the numbers.

Figure 12A:
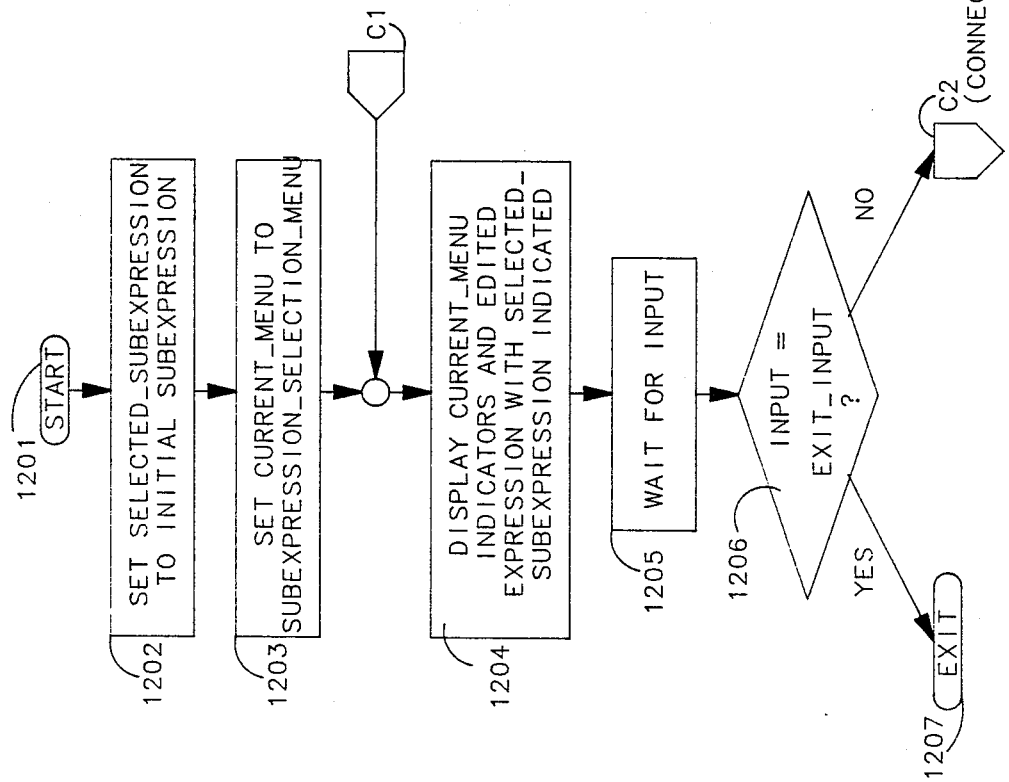

FIGS. 12A, 12B, and 12C illustrate the flow chart of the operations involved in the automated and error-free editing of algebraic expressions in accordance with the present invention. The process of converting a user-entered algebraic expression to the Reverse Polish form in a calculator as shown in FIGS. 11A and 11B is well known in the art of data processing and is not illustrated in this document. Reverse polish notation is discussed hereinabove, in the treatment of the expression LN (2.3+1.0).

The flow chart of FIG. 12A begins with entry block (1201), Which is activated after the user has entered an algebraic expression, or otherwise caused an algebraic expression to be computed, and further the user has executed the operational sequence which causes the embodiment of the present invention to be activated, as discussed with respect to FIGS. 11A-11Q.

In the first processing block (1202) (Step 9 FORM), the selected-subexpression indicator or cursor is initialized to the left-most operator (LN) of the edited expression (as evident in FIG. 11N).

In the next processing block (1203) the current-menu selector is initialized to select the subexpression-selection menu (as evident in FIG. 11P).

In the next processing block (1204) the indicators of the current menu label and the edited expression with the selected subexpression indicated are displayed to the user, FIG. 11Q. In the preferred embodiment of the present invention, the outermost operator (LN in FIG. 11N, plus FIGS. 11A-11Q) of the selected subexpression is always displayed in the second line of the display, and is displayed in reverse-contrast with the remainder of the expression. Otherwise, as much of the expression is shown as will fit on the upper three lines of the display. In the preferred embodiment of the present invention, the menu label with its indicators is displayed in the lowest line of the display.

Processing block (1205) is a loop which is excited when the user invokes an operational command by input to the data processing device. In the preferred embodiment, this consists of pressing one of the multi-function keys 104 or the special keys 105, 107, 109, or 111, of FIG. 1A all of which are on the right front panel of the device.

In decision block (1206), a determination is made whether the user's input matches that defined to be a request to exit the editor (Key 111 of FIG. 1A). In the affirmative case, the program exits through exit block (1207). Otherwise it continues via connector (C2) to decision block (1208) of FIG. 12B.

In decision block (1208), a determination is made whether the user's input matches that of that defined to be a request to return to the subexpression-selection menu (Key 105 of FIG. 1). In the affirmative case, the program proceeds to processing block (1209) wherein the current-menu selector is set to select the subexpression-selector menu. The program then proceeds via connector (CI) to processing block (1204) of FIG. 12A.

In the contrary case, the program proceeds to decision block (1210) wherein a determination is made whether the user's input matches that of that defined to be a request to change the current menu to the next appropriate menu (Key 109 of FIG. 1). In the affirmative case, the program proceeds to process block (1211). In the contrary case, the program proceeds to decision block (1212).

In process block (1211), the program determines the next appropriate menu from the current-menu and the form of the selected subexpression utilizing the next-menu-transition table, illustrated in Table T1, and sets the current-menu selector from this information. The program then proceeds via connector (C1) to processing block (1204) of FIG. 12A.

In decision block (1212), a determination is made whether the user's input matches that of that defined to be a request to change the current menu to the previous appropriate menu (Key 107 followed by Key 109 both of FIG. 1A). In the affirmative case, the program proceeds to process block (1213). In the contrary case, the program proceeds via connector (C3) to processing block (1214) of FIG. 12C.

In process block (1213), the program determines the previous appropriate menu from the current-menu and the form of the selected subexpression utilizing the previous-menu-transition table T2 below and sets the current-menu selector from this information. The program then proceeds via connector (C1) to processing block (1204) of FIG. 12A.

In processing block (1214) of FIG. 12C, the data processing commands of the menu item of the current menu, whose indicator is displayed, and which correspond to the user's input are executed (Key 104 of FIG. 1A). The program then proceeds via connector (C1) to processing block (1204) of FIG. 12A.

FIG. 13 illustrates the flowchart of the data processing commands of menu items used in the preferred embodiment of the present invention which carry out the transformations of subexpressions in a manner concordant with the rules of mathematics. Although this general form is applicable to each of the menu items which transform subexpressions, the details will vary depending on the exact transformation to be carried out. Entry to the processing sequence is through the starting block (1301) which is invoked from processing block 1214 of FIG. 12c. In decision block (1302) a determination is made whether the structure of the selected subexpression matches the template for the particular operation embodied in this processing sequence. These templates are discussed further in the description of tables T3-T12. In the case that the selected subexpression does not match the template, the process returns to the calling program via return (1304). In the case that the selected subexpression matches the template the program proceeds to process block (1303).

Process block (1303) carries out the transformation of the subexpression according to the nature of the operation. These transformations are more fully detailed in the description of Tables T3-T12.

The program then proceeds to process block (1305) in which the selected-subexpression is made to correspond to the newly-transformed subexpression. The program then proceeds to process block (1306).

In process block (1306) the current-menu selector is set to correspond to the subexpression-selection menu and in process block (1307) the current-menu is reset to the next menu appropriate to the newly transformed subexpression which is now the selected subexpression.

After the completion of process block (1307) the program returns to the caller via return (1308).

The flowchart of FIG. 14 illustrates the operation of the menu item Cursor Left in the subexpression-selection menu (Table T3). Entry to the processing sequence is through the starting block (1401) which is invoked from processing block (1214) of FIG. 12C when the current menu is the subexpression-selection menu and the user provides input which signals a request to perform this operation. The process proceeds to decision block (1402) in which a determination is made whether the selected subexpression is the left-most subexpression of the edited expression. In the affirmative case, the process returns to the caller via return block (1403). In the contrary case, the process proceeds to process block (1404). In process block (1404), the next subexpression to the left of the selected subexpression is determined and the subexpression selection indicator is set to correspond with this subexpression. The process then returns to the caller via return block (1405).

The flowchart of FIG. 15 illustrates the operation of the menu item Cursor Right in the subexpression-selection menu (Table T3). Entry to the processing sequence is through the starting block (1501) which is invoked from processing block (1214) of FIG. 12C when the current menu is the subexpression-selection menu and the user provides input which signals a request to perform this operation. The process proceeds to decision block (1502) in which a determination is made whether the selected subexpression is the right-most (the final) subexpression of the edited expression. In the affirmative case, the process returns to the caller via return block (1503). In the contrary case, the process proceeds to process block (1504). In process block (1504) the next subexpression to the right of the selected subexpression is determined and the subexpression selection indicator is set to correspond with this subexpression. The process then returns to the caller via return block (1505).

Tables T1 and T2 below illustrate the next-menu-transition-table and the previous-menu-selection-table, respectively. They are used in process blocks (1211) and (1213) respectively. Each of the illustrated tables have a current-menu column (1) and a form of selected-subexpression row (2). Each entry in the current-menu row corresponds to one of the possible current menus during the operation of the present invention. More information about these menus is contained in tables T3–T13 and their descriptions, below.

Each entry in the form of selected-subexpression row gives schematic illustrations, in algebraic form, of a class of algebraic expressions. In each entry, the single letters A and B represent arbitrary expressions. The other entries are:

A+B—the sum of two expressions
A−B—the difference of two expressions
A*B—the product of two expressions
A/B—the quotient of two expressions
INV(A)—the reciprocal of an expression
−(A)—the negation of an expression
LOG(A)—the base-10 logarithm of an expression
LN(A)—the base-e logarithm of an expression
EXP(A)—the base-e antilogarithm of an expression
ALOG(A)—the base-10 antilogarithm of an expression
A^B—an expression raised to an expression power
other—any expression not in one of the above classes In process block (1211) and (1213), a determination is made as to which of these classes the selected subexpression falls. This determination along with the current-menu is then used to determine the next or previous menu appropriate to the selected subexpression as indicated in the outcome area (3) of the tables. Those parts of the outcome area which are left blank correspond to transitions that do not occur in practice.

Tables T3–T12 below illustrate additional detail about the menus, menu item labels and menu item operations in accordance with the present invention. These are not meant to be an exhaustive description all the possibilities inherent in the present invention, but merely to illustrate a reasonable subset of such.

Each of tables T3–T12 itemizes a menu, or portion thereof, and details an approximation to the characters displayed for the indicator of each menu item (Label column) as well as additional information about the operation of each menu item.

Table T3 details three of the menu items in the subexpression-selection menu: the Cursor Left item, the Cursor Right item, and the LEVEL item. The operation of the first two are illustrated in FIGS. 14 and 15 respectively.

The remaining tables T4–T12 correspond to menus whose items transform the selected subexpression in accordance with standard mathematical rules. For each item of each menu detail on the label for that item (Label column), a common name for the transformation (Name column), a template to match (Form of Subexpression column) in order for the transformation to proceed (as per process block 1302), and the final form of the transformed subexpression (Form of Result column) are included.

In both the Form of Subexpression and Form of Result columns in addition to the conventions detailed for the description of Tables T1 and T2, above, the following conventions are adopted:

The single letters C and D also represent arbitrary expressions.

Single letters repeated in multiple locations in one or both columns represent identical subexpressions.

The written form of the expressions is algebraic as opposed to Reverse Polish form to enhance readability for this disclosure.

Procedures for creating processing sequences which determine whether a subexpression matches a template as detailed in the Form subexpression column are well known in the art and will not be further detailed here.

Procedures for creating processing sequences which transform a subexpression as detailed by the Form of Result column are well known in the art and will not be detailed here.

TABLE T1

NEXT-MENU-TRANSITION-TABLE
FORM OF SELECTED-EXPRESSION

| Current-Menu | A + B or A − B | A*B or A/B | INV(A) or −(A) |
|---|---|---|---|
| Subexpression Selection Standard | 1st-Sum | 1st-Product | INV-NEG |
|  | Sub-Expression Selection | Sub-Expression Selection | Sub-Expression Selection |
| 1st-Sum | 2nd-Sum | | |

TABLE T1-continued
NEXT-MENU-TRANSITION-TABLE
FORM OF SELECTED-EXPRESSION

| Current-Menu | Standard | 2nd-Product | Standard |  |  |
|---|---|---|---|---|---|
| 2nd-Sum | Standard | | | | |
| 1st-Product | | 2nd-Product | | | |
| 2nd-Product | | | Standard | | |
| INV-NEG | | | | Standard | |
| LOG | | | | | |
| EXP | | | | | |
| POWER | | | | | |

| Current-Menu | LOG(A) or LN(A) | EXP(A) or ALOG(A) | A^B | Other |
|---|---|---|---|---|
| Subexpression Selection | Log | EXP | Power | Standard |
| Standard | Sub-Expression Selection | Sub-Expression Selection | Sub-Expression Selection | Sub-Expression Selection |
| 1st-Sum | | | | |
| 2nd-Sum | | | | |
| 1st-Product | | | | |
| 2nd-Product | | | | |
| INV-NEG | | | | |
| LOG | Standard | | | |
| EXP | | Standard | | |
| POWER | | | Standard | |

TABLE T2
PREVIOUS-MENU-TRANSITION-TABLE
FORM OF SELECTED-SUBEXPRESSION

| Current-Menu | A + B or A − B | A*B or A/B | INV(A) or −(A) |
|---|---|---|---|
| Subexpression Selection | Standard | Standard | Standard |
| Standard | 2nd-Sum | 2nd-Product | INV-NEG |
| 1st-Sum | Sub-Expression Selection | | |
| 2nd-Sum | 1st-Sum | | |
| 1st-Product | | Sub-Expression Selection | |
| 2nd-Product | | 1st-Product | |
| INV-NEG | | | Sub-Expression Selection |
| LOG | | | |
| POWER | | | |

| Current-Menu | LOG(A) or LN(A) | EXP(A) or ALOG(A) | A^B | Other |
|---|---|---|---|---|
| Subexpression Selection | Standard | Standard | Standard | Standard |
| Standard | LOG | EXP | Power | Sub-Expression Selection |
| 1st-Sum | | | | |
| 2nd-Sum | | | | |
| 1st-Product | | | | |
| 2nd-Product | | | | |
| INV-NEG | | | | |
| LOG | Sub-Expression Selection | | | |
| EXP | | Sub-Expression Selection | | |
| POWER | | | Sub-Expression Selection | |

TABLE T3
SUBEXPRESSION SELECTION MENU

| Label | Name | Operation |
|---|---|---|
| <− | Cursor Left | Select next subexpression to the left |
| −> | Cursor Right | Select next subexpression to the right |
| LEVEL | LEVEL | Display argument level of selected subexpression |

TABLE T4
STANDARD MENU

| Label | Name | Form of Subexpression | Form of Result |
|---|---|---|---|
| DNEG | Double Negation | A | −(−(A)) |
| DINV | Double Reciprocal | A | INV(INV(A)) |
| *1 | Multiply by 1 | A | A*1 |
| /1 | Divide by 1 | A | A/1 |
| ^1 | Raise to the First Power | A | A^1 |
| +1−1 | Add and Subtract 1 | A | (A+1)−1 |

TABLE T5
1st-SUM MENU

| Label | Name | Form of Subexpression | Form of Result |
|---|---|---|---|
| −() | Write as Negation | A + B<br>A − B | −(−A − B)<br>−(−A+B) |
| <−> | Commute | A + B<br>A − B | B + A<br>−B + A |
| <−M | Merge Left Factors or Operators | A*B + A*C<br>LN (A) + LN (B)<br>LOG (A) + LOG (B)<br>A − B<br>−A − B<br>LOG(A)−LOG(B)<br>LN(A)−LN(B) | A*(B + C)<br>LN (A*B)<br>LOG (A*B)<br>−(−A + B)<br>−(A + B)<br>LOG (A / B)<br>LN (A / B) |
| M−> | Merge Right Factors | A*C + B*C<br>A / C + B / C<br>A*C − B*C<br>A / C − B / C | (A + B)*C<br>(A + B) / C<br>(A − B)*C<br>(A − B) / C |
| <−A | Associate Left | A + (B + C)<br>A + (B − C)<br>A − (B + C)<br>A − (B − C) | (A + B) + C<br>(A + B) − C<br>(A − B) − C<br>(A − B) + C |
| A−> | Associate Right | A + (B + C)<br>(A − B) + C<br>(A + B) − C<br>(A − B) − C | (A + B) + C<br>A − (B − C)<br>A + (B − C)<br>A − (B + C) |

TABLE T6
2nd-SUM MENU

| Label | Name | Form of Subexpression | Form of Result |
|---|---|---|---|
| AF | Add Fractions | A / B + C / D<br>A + B / C<br>A / B + C<br>A / B − C / D<br>A − B / C<br>A / B − C | (A*D + B*C) / (B*D)<br>(A*C + B) / C<br>(A + B*C) / B<br>(A*D − B*C)/(B*D)<br>(A*C − B) / C<br>(A − B*C) / B |

TABLE T7
1st-PRODUCT MENU

| Label | Name | Form of Subexpression | Form of Result |
|---|---|---|---|
| 1/() | Write as Inverse | A*B<br>A / B<br>INV(A)*B | INV(INV(A)/B)<br>INV(INV(A)*B)<br>INV(A / B) |

TABLE T7-continued

1st-PRODUCT MENU

| Label | Name | Form of Subexpression | Form of Result |
|---|---|---|---|
|  |  | INV(A) / B | INV(A*B) |
| <—> | Commute | A*B | B*A |
|  |  | INV(A)*B | B / A |
|  |  | A / B | INV(B)*A |
| <—D | Distribute Left | (A + B)*C | A*C + B*C |
|  |  | (A − B)*C | A*C − B*C |
|  |  | (A + B) / C | A / C + B / C |
|  |  | (A − B) / C | A / C − B / C |
| D—> | Distribute | A*(B + C) | A*B + A*C |
|  |  | A*(B − C) | A*B − A*C |
|  |  | A / (B+C) | INV(((INV(A)*B+(INV(A)*C)) |
|  |  | A / (B−C) | INV(((INV(A)*B−(INV(A)*C)) |
| <—A | Associate Left | A*(B*C) | (A*B)*C |
|  |  | A*(B / C) | (A*B) / C |
|  |  | A / (B*C) | (A / B) / C |
|  |  | A / (B / C) | (A / B)*C |
| A—> | Associate Right | (A*B)*C | A*(B*C) |
|  |  | (A / B)*C | A / (B / C) |
|  |  | (A*B) / C | A*(B / C) |
|  |  | (A / B) / C | A / (B*C) |

TABLE T8

2nd-PRODUCT MENU

| Label | Name | Form of Subexpression | Form of Result |
|---|---|---|---|
| −() | Write as Negation | −A*B | −(A*B) |
|  |  | A*−B | − (−A*B) |
|  |  | −A / B | −(A / B) |
|  |  | A / −B | − (−A / B) |
| L() | Write as Logarithm | LN (A)*B | LN (A ^ B) |
|  |  | LOG (A)*B | LOG (A ^ B) |
|  |  | LN (A) / B | LN (A ^ INV(B)) |
|  |  | LOG (A) / B | LOG (A ^ INV(B)) |
| <—M | Merge Left Operands or Operators | A ^ B*A ^ C | A ^ (B + C) |
|  |  | EXP (A)*EXP (B) | EXP (A + B) |
|  |  | ALOG(A)*ALOG(B) | ALOG (A + B) |
|  |  | A ^ B / A ^ C | A ^ (B − C) |
|  |  | ALOG(A) / ALOG(B) | ALOG (A − B) |
|  |  | EXP (A) / EXP (B) | EXP (A −B) |
| M—> | Merge Right Operands | A ^ C*B ^ C | (A*B) ^ C |
|  |  | A ^ C / B ^ C | (A / B) ^ C |

TABLE T9

INV-NEG MENU

| Label | Name | Form of Subexpression | Form of Result |
|---|---|---|---|
| —>() | Distribute Over Expression | − (A + B) | −A − B |
|  |  | − (A − B) | −A + B |
|  |  | −(A*B) | −A*B |
|  |  | −(A / B) | −A / B |
|  |  | −LN (A) | LN (INV(A)) |
|  |  | −LOG (A) | LOG (INV(A)) |
|  |  | INV((A ^ B)) | A ^ −B |
|  |  | INV(EXP (A)) | EXP (−A) |
|  |  | INV(ALOG (A)) | ALOG (−A) |

TABLE T10

LOG MENU

| Label | Name | Form of Subexpression | Form of Result |
|---|---|---|---|
| −() | Write as Negation | LN ( INV(A)) | −LN (A) |
|  |  | LN (A) | −LN (INV(A)) |
|  |  | LOG ( INV(A)) | −LOG (A) |
|  |  | LOG (A) | −LOG(INV(A)) |
| L* | Write as Product | LN (A ^ B) | LN(A)*B |
|  |  | LOG (A ^ B) | LOG(A)*B |
| D—> | Write as Sum | LN (A*B) | LN (A) + LN (B) |
|  |  | LN (A / B) | LN (A) − LN (B) |

TABLE T10-continued

LOG MENU

| Label | Name | Form of Subexpression | Form of Result |
|---|---|---|---|
|  |  | LOG (A*B) | LOG (A) + LOG (B) |

TABLE T11

EXP MENU

| Label | Name | Form of Subexpression | Form of Result |
|---|---|---|---|
| 1/() | Write as Inverse | EXP (−A) | INV(EXP (A)) |
|  |  | EXP (A) | INV(EXP (−A)) |
|  |  | ALOG (−A) | INV(ALOG (A)) |
|  |  | ALOG (A) | INV(ALOG (−A)) |
| E | Write as Power of Exponential | EXP(A*B) | (EXP (A)) ^ B |
|  |  | EXP(A / B) | (EXP(A)) ^ INV(B) |
|  |  | ALOG(A*B) | (ALOG (A)) ^ B |
|  |  | ALOG(A / B) | (ALOG (A)) ^ INV(B) |
| D—> | Distribute Over Sum | EXP (A + B) | EXP (A)*EXP (B) |
|  |  | EXP (A − B) | EXP (A) / EXP (B) |
|  |  | ALOG (A + B) | ALOG (A)*ALOG(B) |
|  |  | ALOG (A − B) | ALOG (A)/ALOG(B) |

TABLE T12

POWER MENU

| Label | Name | Form of Subexpression | Form of Result |
|---|---|---|---|
| 1/() | Write as Inverse | A ^ B | INV((A ^ −B)) |
|  |  | A ^ −B | INV((A ^ B)) |
| E | Write as Exponential | (EXP (A)) ^ B | EXP (A*B) |
|  |  | (ALOG (A)) ^ B | ALGO (A*B) |
| <—D | Distribute Over Product | (A*B) ^ C | A ^ C*B ^ C |
|  |  | (A / B) ^ C | A ^ C / B ^ C |
| D—> | Distribute Over Sum | A ^ (B + C) | A ^ B*A ^ C |
|  |  | A ^ (B − C) | A ^ B / A ^ C |
| <—A | Write as Power of Power | A ^ (B*C) | (A ^ B) ^ C |
| A—> | Write Exponent as Product | (A ^ B) ^ C | A ^ (B*C) |

INDUSTRIAL APPLICABILITY

This invention is applicable generally in data processing operations involving the manipulation and editing of expressions defining physical, economic, or other relationships.

I claim:

1. A data processor, comprising:
   a. a memory;
   b. objects in said memory;
   c. individual interface elements for accessing individual objects in memory;
   d. menus in said memory having items defining operations to be performed on mathematical expressions concordant with the syntax of such expressions;
   e. a display;
   f. means responsive to actuation of individual interface elements for displaying individual objects in human readable form on said display, pluralities of said objects on said display defining a selected mathematical expression and
   g. means responsive to a selected mathematical expression for accessing a menu in said memory having individual items for performing operations on said expression concordant with the syntax of the selected mathematical expression and for displaying a human-readable label of each item on said display.

2. The invention according to claim 1, comprising:
   a. means responsive to actuation of at least one interface element for selecting a different menu from the menus containing said selected menu.

3. In a data processor means for selecting an expression and for indicating an operation to be performed on selected expression comprising:
   a. a memory;
   b. a display;
   c. a plurality of user actuable interface elements;
   d. one object in said memory for each of said interface elements, each object characterizing its interface element;
   e. means for displaying individual objects in human-readable form on said display in the sequence of actuation of said interface elements, to form a selected expression;
   f. menu groups in memory, each menu of each group having indicators of operations performable on a selected expression, at least one menu of a group being addressed by said selected expression; and
   g. means for displaying said indicators of operations of said at least one menu on said display, each of said indicators defining an operation on said selected expression concordant with the syntax of said selected expression.

4. The invention according to claim 3, further comprising:
   a. means responsive to actuation of an interface element for selecting an indicator from said at least one menu for selecting and displaying a different menu containing other indicators for performing operations on said selected expression.

5. The invention according to claim 3, further comprising:
   a. means responsive to actuation of an interface element for selecting an indicator from said at least one menu for applying a cursor to a subexpression portion of said selected expression and for selecting a different menu from said genus having a cursor indicator providing for control of said cursor upon actuation of an interface element associated with said cursor indicator so that said cursor may be moved to a selected operator of said expression.

6. The invention according to claim 5, further comprising:
   a. means responsive to actuation of another interface element for selecting still another menu from said menus, having an indicator for performing an editing operation upon said subexpression.

7. In a data processing device having a memory, a display, and a plurality of user actuable interface elements, the method of determining operations to be performed on expressions in memory selected by actuation of said interface elements, comprising:
   a. providing menu groups in memory, each menu of a menu group having individual labels of operations concordant with the syntax of individual expressions;
   b. selecting a particular expression in memory and displaying said expression; and
   c. employing said expression to address a menu group in memory and to display the names of menus in that menu group.

8. The method according to claim 7, further comprising:
   a. selecting a menu of said menu groups;
   b. employing the selection of said menu to select and display a different menu having labels indicative of different operations to be performed on said expression.

9. The method according to claim 8, further comprising:
   a. employing a label of said different menu for selecting an operator of said expression for indicating that part of the expression associated with that operator which is to be edited.

10. The method according to claim 9, further comprising:
    a. selecting a further menu from the menu group having said different menu and employing a label from said further menu for determining an editing operation to be performed upon said part of the expression concordant with the syntax of said part of the expression.

* * * * *

UNITED STATES PATENT AND TRADEMARK OFFICE
CERTIFICATE OF CORRECTION

PATENT NO. : 4,852,057
DATED : July 25, 1989
INVENTOR(S) : Charles M. Patton

It is certified that error appears in the above-identified patent and that said Letters Patent is hereby corrected as shown below:

Column 4, line 2, "use" should be --user--;

Column 7, line 38; "unitary" should be --uniary--;

Column 19, line 42; "genus" should be --menus--.

Signed and Sealed this

Fifteenth Day of December, 1992

*Attest:*

DOUGLAS B. COMER

*Attesting Officer*   *Acting Commissioner of Patents and Trademarks*